US009467676B2

(12) United States Patent
Yang et al.

(10) Patent No.: US 9,467,676 B2
(45) Date of Patent: Oct. 11, 2016

(54) MULTI-VIEW VIDEO CODING AND DECODING METHODS AND APPARATUSES, CODER, AND DECODER

(71) Applicant: Huawei Technologies Co., Ltd., Shenzhen, Guangdong (CN)

(72) Inventors: Mingyuan Yang, Shenzhen (CN); Jiali Fu, Shenzhen (CN); Fabian Jaeger, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 14/285,962

(22) Filed: May 23, 2014

(65) Prior Publication Data

US 2014/0254690 A1    Sep. 11, 2014

Related U.S. Application Data

(63) Continuation of application No. PCT/CN2012/079503, filed on Aug. 1, 2012.

(30) Foreign Application Priority Data

Nov. 23, 2011 (CN) .......................... 2011 1 0376564

(51) Int. Cl.
*H04N 13/00* (2006.01)
*H04N 19/597* (2014.01)
*H04N 19/192* (2014.01)

(52) U.S. Cl.
CPC ...... *H04N 13/0022* (2013.01); *H04N 13/0048* (2013.01); *H04N 19/597* (2014.11); *H04N 19/192* (2014.11); *H04N 2013/0081* (2013.01)

(58) Field of Classification Search
CPC .......................... H04N 13/0022; H04N 19/597
USPC ..................................................... 375/240.26
See application file for complete search history.

(56) References Cited

U.S. PATENT DOCUMENTS

2011/0142138 A1* 6/2011 Tian .................. H04N 13/0022
                                                                375/240.24
2011/0211634 A1   9/2011 Goedeken et al.

FOREIGN PATENT DOCUMENTS

| CN | 101056398 A | 10/2007 |
| CN | 101483770 A | 7/2009 |
| CN | 101917619 A | 12/2010 |

OTHER PUBLICATIONS

Fabian Jager, et al., "Description of 3D Video Coding Technology Proposal by RWTH Aachen University", Nov. 2011, 21 pages.

(Continued)

*Primary Examiner* — Jeffery Williams

(57) ABSTRACT

Embodiments of the present invention provide multi-view video coding and coding methods and corresponding apparatuses. The multi-view video coding method includes: minimizing an error between a currently coded view image and a warped view image of a front view image to obtain an optimal warping offset; calculating disparity information between the front view image and the currently coded view image by using the optimal warping offset, a camera parameter of a view, and depth image information of the front view image; and calculating the warped view image of the front view image by using the disparity information and the front view image, and predicting a current view image by using the warped view image as a prediction signal.

26 Claims, 7 Drawing Sheets

(56) References Cited

OTHER PUBLICATIONS

Yoshitomo Takahashi, et al., "Descriptions of 3D Video Coding Proposal (HEVC-Compatible Category)", Nov. 2011, 36 pages.
Nikolce Stefanoski, et al., "Description of 3D Video Coding Technology Proposal by Disney Research Zurich and Fraunhofer HHI", Nov. 2011, 34 pages.
Derek Pang, et al., "Multiview Video Coding Using Projective Rectification-Based View Extrapolation and Synthesis Bias Correction", IEEE, Jun. 28, 2009, p. 5-8.
Kiran Nanjunda Iyer, et al., "Multiview Video Coding Using Depth Based 3D Warping", IEEE, Jul. 19, 2010, p. 1108-1113.
Guofeng Zhang et al., "Stereoscopic Video Synthesis from a Monocular Video", IEEE Transactions on Visualization and Computer Graphics, vol. 13, No. 4, Jul./Aug. 2007, p. 686-696.

* cited by examiner

US 9,467,676 B2

MULTI-VIEW VIDEO CODING AND DECODING METHODS AND APPARATUSES, CODER, AND DECODER

CROSS-REFERENCE TO RELATED APPLICATIONS

This application is a continuation of International Application No. PCT/CN2012/079503, filed on Aug. 1, 2012, which claims priority to Chinese Patent Application No. 201110376564.1, filed on Nov. 23, 2011, both of which are hereby incorporated by reference in their entireties.

TECHNICAL FIELD

The present invention relates to the field of video coding and decoding technologies, and in particular, to multi-view video coding and decoding methods and apparatuses, a coder, and a decoder.

BACKGROUND

Multi-view video coding (Multi-view Video Coding, MVC) is a technology put forward in H.264/AVC (Advanced Video Coding, advanced video coding) and is mainly used for coding a stereoscopic video or multi-angle three-dimensional video content.

Disparity vectors in the MVC represent redundant information of a same scene recorded between different views. The disparity vectors are vectors in a unit of a block, and are obtained by a coding end by calculation with a non-normative (non-normative) motion estimation algorithm. For another view, a displaced (displaced) block area of a view coded before may be used as a prediction signal of a currently coded area of the view according to a disparity vector. The disparity vectors in the unit of a block cannot accurately describe disparity information between multiple views, so that it is difficult for an MVC coding method to generate high-quality prediction signals used for compression of different views.

In the prior art, a three-dimensional video coding (3D Video Coding, 3DV) method is provided, and in the 3DV coding method, depth information is added. The depth information is used for describing a position relationship of each pixel between different views, so that a prediction signal which has relatively high quality and is used for compression of different views can be generated in the 3DV coding technology.

At the coding end, a process of the 3DV coding method is described briefly as follows, where a base view is coded by using a conventional coding standard: After the base view is coded, when a next view is coded, disparity information between a coded front view image and a view to be currently coded is calculated by using camera parameter information and depth image information of the front view image; a warping operation is performed on the front view image by using the disparity information to obtain a warped view image; and the warped view image is used as a reference image of a coding unit of the view to be currently coded, and coding processing is performed on the view to be currently coded.

The disparity calculation may introduce pixel shift noise to an object or a local part of the object, which makes a pixel position after the warping not completely consistent with a position of the object in another view. This phenomenon may be explained as a rounding effect, and the effect is more obvious for an object near to a camera than for an object far away from the camera. The occurrence of the rounding effect reduces the precision of a warped view image obtained according to disparity information, and further affects the compression efficiency of the 3DV coding.

SUMMARY

An embodiment of the present invention provides a multi-view video coding method, so as to improve precision of a warped view image.

An embodiment of the present invention provides a multi-view video coding method, where the method includes:

minimizing an error between a currently coded view image and a warped view image of a front view image to obtain an optimal warping offset;

obtaining disparity information between the front view image and the currently coded view image according to the optimal warping offset, a camera parameter of a view, and depth image information of the front view image; and determining the warped view image of the front view image according to the disparity information and the front view image, and performing predictive coding on the currently coded view image by using the warped view image as a prediction signal.

An embodiment of the present invention further provides a multi-view video decoding method, where the method includes:

parsing a code stream of a current view image to obtain an optimal warping offset;

determining disparity information between a front view image and a currently decoded view image according to the optimal warping offset, a camera parameter of a view, and depth image information of the front view image;

calculating, according to the disparity information, a warped view image of the front view image relative to the currently decoded view image; and using the warped view image as a reference image for reconstructing the currently decoded view image.

An embodiment of the present invention further provides a multi-view video coding apparatus, where the apparatus includes:

an optimal warping offset obtaining unit, configured to minimize an error between a currently coded view image and a warped view image of a front view image to obtain an optimal warping offset;

a first disparity information calculating unit, configured to obtain disparity information between the front view image and the currently coded view image according to the optimal warping offset, a camera parameter of a view, and depth image information of the front view image;

a first warped view image calculating unit, configured to determine the warped view image of the front view image according to the disparity information and the front view image; and a first coding prediction unit, configured to perform predictive coding on the currently coded view image by using the warped view image as a prediction signal.

An embodiment of the present invention further provides a multi-view video decoding apparatus, where the apparatus includes:

a code stream parsing unit, configured to parse a code stream of a current view image to obtain an optimal warping offset;

a second disparity information calculating unit, configured to determine disparity information between a front view image and a currently decoded view image according to the optimal warping offset, a camera parameter of a view, and depth image information of the front view image;

a second warped view image calculating unit, configured to calculate a warped view image of the front view image according to the disparity information and the front view image; and a first decoding prediction unit, configured to use the warped view image as a reference image for reconstructing the currently decoded view image.

Embodiments of the present invention further provide a coder including the multi-view video coding apparatus and a decoder including the multi-view video decoding apparatus.

In the embodiments of the present invention, an optimal warping offset is obtained by minimizing an error between a currently coded view image and a warped view image of a front view image, and disparity information is corrected by using the optimal warping offset, thereby enhancing the precision of a warped view image, and improving image quality of a multi-view video.

BRIEF DESCRIPTION OF THE DRAWINGS

To describe the technical solutions according to the embodiments of the present invention more clearly, the accompanying drawings for describing the embodiments are introduced briefly in the following. Apparently, the accompanying drawings in the following description are only some embodiments of the present invention, and a person of ordinary skill in the art can derive other drawings from the accompanying drawings without creative efforts.

DETAILED DESCRIPTION

In order to make the objectives, technical solutions, and advantages of the present invention more comprehensible, the technical solutions according to embodiments of the present invention are clearly described in the following with reference to the accompanying drawings. Apparently, the embodiments in the following description are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, an optimal warping offset is obtained by minimizing an error between a currently coded view image and a warped view image of a front view image, and disparity information is corrected by using the optimal warping offset, thereby enhancing precision of a warped view image, and further, improving image quality of a multi-view video.

To describe technical solutions of the present invention, the following gives a description by using specific embodiments.

Embodiment 1

Figure 1:
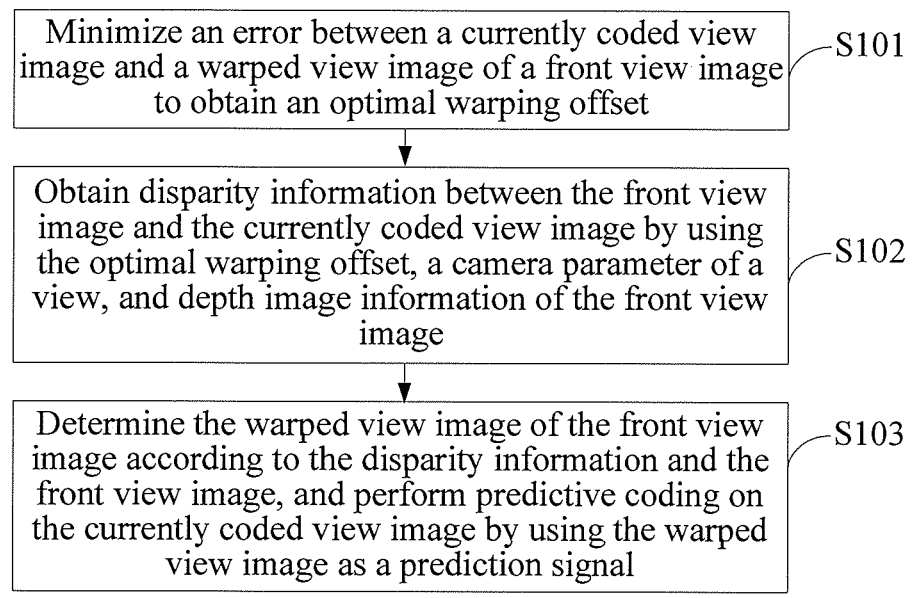
FIG. 1 is an implementation flowchart of a multi-view video coding method according to an embodiment of the present invention.

FIG. 1 shows an implementation process of a multi-view video coding method according to an embodiment of the present invention. Details are described as follows:

In step S101, minimize an error between a currently coded view image and a warped view image of a front view image to obtain an optimal warping offset.

The currently coded view image is a view image being currently coded. The front view image may be a front coded view image of the currently coded view image in a spatial domain. The warped view image of the front view image is obtained by performing, by using a view warping algorithm, a warping operation on the front view image. The view image includes a video image and a depth image. The warped view image includes a warped video image and a warped depth image.

In the embodiment of the present invention, a warped video image of the front view image and the warped depth image may use a same optimal warping offset, or may also use respective optimal warping offsets respectively.

When the warped video image of the front view image and the warped depth image use respective optimal warping offsets respectively, an error between a coded video image of the currently coded view image and a coded video image of the front view image is minimized to obtain an optimal warping offset of the warped video image of the front view image, and an error between a depth image of the currently coded view image and a warped depth image of the front view image is minimized to obtain an optimal warping offset of the warped depth image of the front view image.

In the embodiment of the present invention, when multiple optimal warping offsets exist, a bit rate required for coding can also be reduced by using predictive compression between the multiple optimal warping offsets. An example is used for description in the following: If a correlation exists between the multiple optimal warping offsets, one of the multiple optimal warping offsets may be transmitted, and for another optimal warping offset, merely a difference from the transmitted optimal warping offset may be transmitted; and in this manner, the bit rate required for coding can be reduced.

In the embodiment of the present invention, the optimal warping offset may be used for correcting a whole image, and may also be used for correcting part of an image, for example, a slice.

The error between the currently coded view image and the warped view image of the front view image includes, but is not limited to, a sum of absolute differences (Sum of Absolute Differences, SAD), a mean square error (Mean Square Error, MSE), a sum of squares for error (Sum of Squares for Error, SSE) and the like.

The error between the currently coded view image and the warped view image of the front view image is minimized in multiple manners. For example, the following manner may be used: setting a preset offset range, correcting the disparity information between the front view image and the currently coded view image by separately using all values in the preset offset range as a warping offset, obtaining the warped view image of the front view image by using the disparity information, calculating the error between the currently coded view image and the warped view image of the front view image, selecting, from the preset offset range, a value making the error between the currently coded view image and the warped view image of the front view image minimum, and determining the value as an optimal warping offset. All the values in the preset offset range include an integral value or a fractional value, and the fractional value is a fractional value with one decimal place. Definitely, the error between the currently coded view image and the warped view image of the front view image may also be minimized in other manners, which are not described herein one by one by using examples.

In step S102, obtain disparity information between the front view image and the currently coded view image according to the optimal warping offset, a camera parameter of a view, and depth image information of the front view image.

The camera parameter of the view includes a focal length of a camera, a spatial position of the camera, information about depth of field and the like. A unit of the disparity information is a pixel point.

The step of obtaining disparity information between the front view image and the currently coded view image according to the optimal warping offset, a camera parameter of a view, and depth image information of the front view image specifically includes:

calculating an initial disparity signal according to the camera parameter of the view and the depth image information of the front view image;

obtaining an offset correction signal according to the optimal warping offset and the depth image information of the front view image; and obtaining the disparity information between the front view image and the currently coded view image according to the initial disparity signal and the offset correction signal.

In the embodiment of the present invention, disparity information of each pixel position between the front view image and the currently coded view image may be calculated by using the following formula:

$$disp(p) = \frac{f}{z} * (X_{add} - X_{base}) + offset_i * \frac{d}{d_{max}} * \alpha$$

where f is a focal length of a camera of a currently coded view, z is a distance between an object and the view, $X_{add}$ is a position of the currently coded view at a view line in 3D space, $X_{base}$ is a position of the front view image at the view line in the 3D space, $offset_i$ is the optimal warping offset obtained in step S101, d is a depth value of a current pixel, $d_{max}$ is a maximum depth value of a depth of the current view image, and $\alpha$ is half-pixel precision.

In step S103, determine the warped view image of the front view image according to the disparity information and the front view image, and perform predictive coding on the currently coded view image by using the warped view image as a prediction signal.

In the embodiment of the present invention, an optimal warping offset is obtained by minimizing an error between a currently coded view image and a warped view image of a front view image, and disparity information is corrected by using the optimal warping offset, so that the precision of the warped view image of the front view image can be enhanced, thereby enhancing image quality of a multi-view video.

In an exemplary embodiment of the present invention, after step S101, the method further includes the following step:

writing the optimal warping offset into a code stream.

In this embodiment, since an optimal warping offset is coded into a code stream, a decoding end can calculate disparity information according to the optimal warping offset in the code stream and obtain a warped view image of a front view image according to the disparity information, and the warped view image of the front view image can be used as a reference image for reconstructing a currently decoded view image, so that the decoding end can decode and reconstruct each view. The method in the embodiment of the present invention may be executed by a processor (for example, a central processing unit CPU), an application specific integrated circuit (ASIC) or the like.

Embodiment 2

Figure 2:
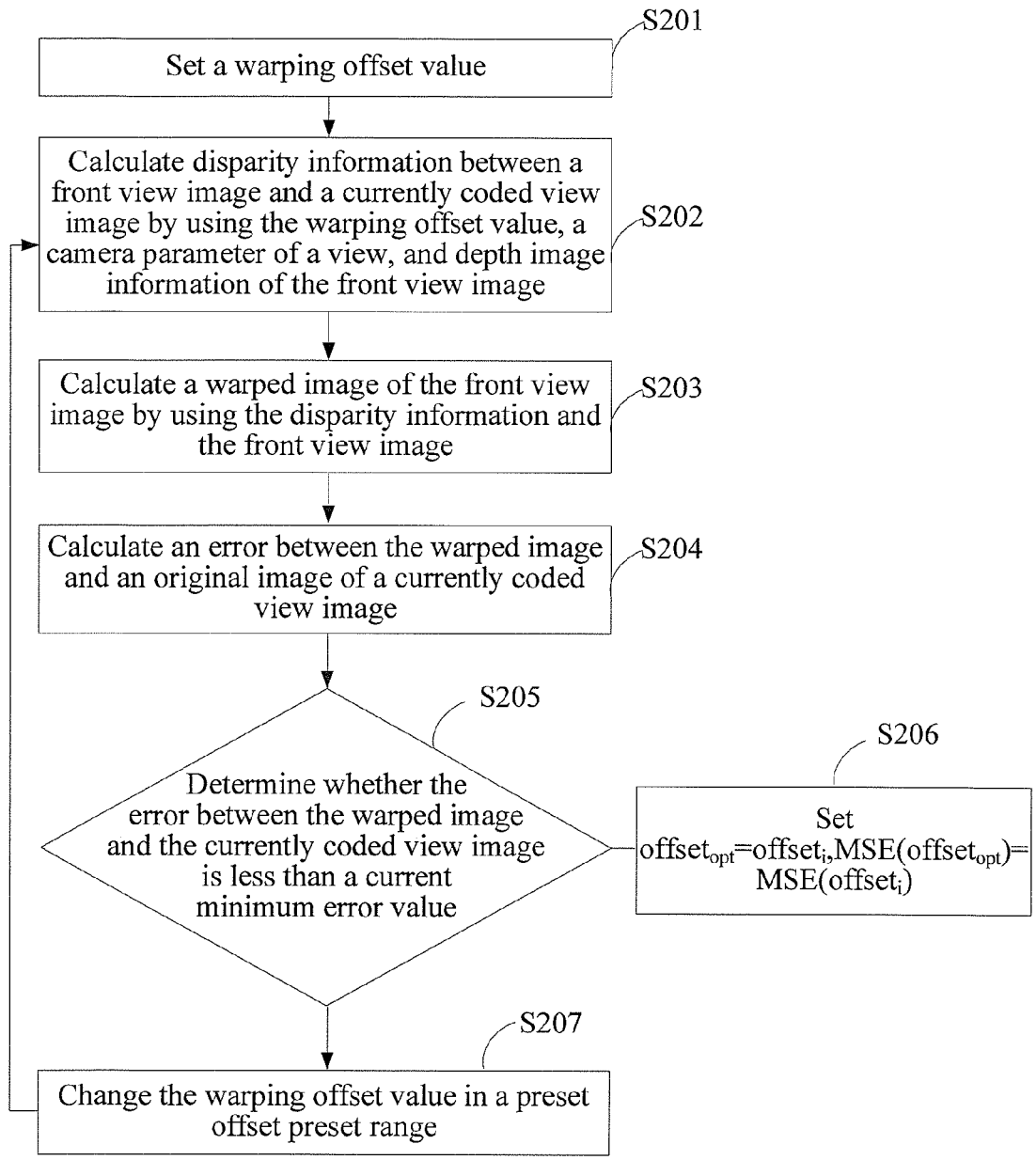
FIG. 2 is an implementation flowchart of minimizing an error between a currently coded view image and a warped view image of a front view image to obtain an optimal warping offset according to an embodiment of the present invention.

FIG. 2 shows an implementation process of minimizing an error between a currently coded view image and a warped view image of a front view image to obtain an optimal warping offset according to an embodiment of the present invention. Details are described as follows:

In step S201, set a warping offset value $offset_i$.

In the embodiment of the present invention, the warping offset value $offset_i$ may be set to any value.

In step S202, determine disparity information between the front view image and the currently coded view image according to the warping offset value $offset_i$, a camera parameter of a view, and depth image information of the front view image. A unit of the disparity information may be a pixel point.

In the embodiment of the present invention, disparity information of each pixel position between the front view image and the currently coded view image may be calculated by using the following formula:

$$disp(p) = \frac{f}{z} * (X_{add} - X_{base}) + offset_i * \frac{d}{d_{max}} * \alpha$$

where f is a focal length of a camera of a current view image, z is a distance between an object and the view, $X_{add}$ is a position of the current view image at a view line in 3D space, $X_{add}$ is a position of the front view image at the view line in the 3D space, d is a depth value of a current pixel, $d_{max}$ is a maximum depth value of a depth of the current view image, and $\alpha$ is half-pixel precision.

In step S203, determine the warped view image of the front view image according to the disparity information and the front view image. The specific process of determining the warped view image of the front view image according to the disparity information and the front view image belongs to the prior art, and details are not repeatedly described herein.

In step S204, calculate an error between the warped view image and an original image of the currently coded view image. The warped view image includes a warped video image and a warped depth image, and the original image of the currently coded view image includes an original video image and an original depth image. An example of calculating a mean square error between the warped view image and the original image of the currently coded view image is used for description.

A specific process of calculating the mean square error is as follows:

$$MSE(offset_i) = \frac{1}{n}\sum_{i=1}^{n}(X_i - Y_i)$$

where MSE(offset$_i$) refers to the mean square error between the warped view image and the currently coded view image, X$_i$ is a pixel of the currently coded view image, and Y$_i$ is a pixel of the warped view image.

In the embodiment of the present invention, as the mean square error between the warped view image and the currently coded view image becomes smaller, it indicates that the warped view image obtained according to the warping offset is closer to the currently coded view image.

In step S205, determine whether an error between the warped view image and the currently coded view image is less than a current minimum error value; if yes, perform step S206; otherwise, perform step S207. The minimum error value is set to a maximal value at a beginning stage.

The determining whether the mean square error between the warped view image and the original image of the currently coded view is less than a preset maximal value is used as an example, and a specific determination step is:

determining whether MSE(offset$_i$)<MSE(offset$_{opt}$) is satisfied; if yes, performing step S206; otherwise, performing step S207.

In step S206, set offset$_{opt}$=offset$_i$ and MSE(offset$_{opt}$)= MSE(offset$_i$)

In step S207, change the warping offset value offset$_i$ within a preset offset range that is preset, and return to step S202.

The preset offset range refers to a change range of the warping offset value offset$_i$ For example, the preset offset range may be set to [-2, 2], but the preset offset range is not limited to that described in this example.

The changing the warping offset value offset$_i$ within the preset offset range that is preset refers to changing the warping offset value offset$_i$ into any unused value in the preset offset range.

By using the foregoing steps, all values in the preset offset range are traversed, that is, after all the values in the preset offset range are set as the warping offset value offset$_i$, a value which makes MSE(offset$_i$) minimum can be found in the preset offset range, and the value is determined as the optimal warping offset. All the values in the preset offset range include an integral value or a fractional value, and the fractional value is a fractional value with one decimal place.

In the embodiment of the present invention, a value which makes ME(offset$_i$) minimum can be found in the preset offset range, that is, a warping offset value which makes the warped view image closest to the original image of the currently coded view image can be found in the preset offset range, and the value is determined as the optimal warping offset, so that the precision of the warped view image can be greatly improved.

Embodiment 3

Figure 3:
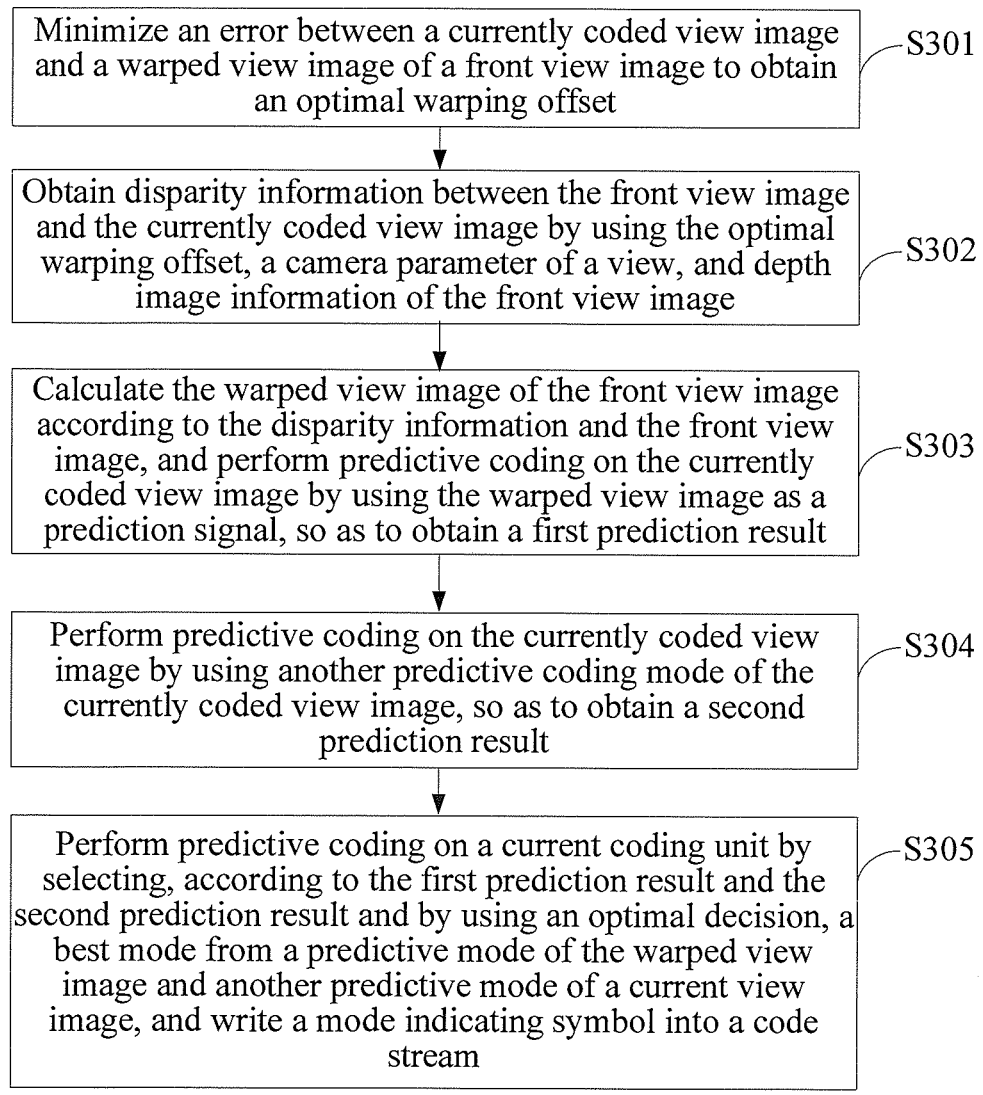
FIG. 3 is an implementation flowchart of a multi-view video coding method according to another embodiment of the present invention.

FIG. 3 shows an implementation process of a multi-view video coding method according to another embodiment of the present invention. Step S301 and step S302 are the same as step S101 and step S102 in FIG. 1, with a difference in that the following steps are further included, and details are described as follows:

In step S303, calculate the warped view image of the front view image according to the disparity information and the front view image, and perform predictive coding on the currently coded view image by using the warped view image as a prediction signal, so as to obtain a first prediction result.

In step S304, perform predictive coding on the currently coded view image by using another predictive coding mode of the currently coded view image, so as to obtain a second prediction result.

In step S305, perform predictive coding on a current coding unit by selecting, according to the first prediction result and the second prediction result and by using an optimal decision, a best mode from a predictive mode of the warped view image and another predictive mode of a current view image, and write a mode indicating symbol into a code stream. The optimal decision includes, but is not limited to, a rate-distortion decision. The mode indicating symbol is used for identifying the best mode that is selected, by using the optimal decision, from the predictive mode of the warped view image and the other predictive mode of the current view image. The predictive mode of the warped view image refers to a mode in which predictive coding is performed on the currently coded view image by using the warped view image as a prediction signal.

For example, when the best mode selected from the predictive mode of the warped view image and the another predictive mode of the current view image by using the optimal decision is the predictive mode of the warped view image, the mode indicating symbol is set to WarpSkip-Mode=1; when the best mode selected from the predictive mode of the warped view image and the another predictive mode of the current view image by using the optimal decision is the another predictive mode of the current view image, the mode indicating symbol is set to WarpSkip-Mode=0; and the mode indicating symbol is written into the code stream, so that after a decoder receives the code stream, the decoder can perform decoding correctly according to the mode indicating symbol.

Embodiment 4

Figure 4:
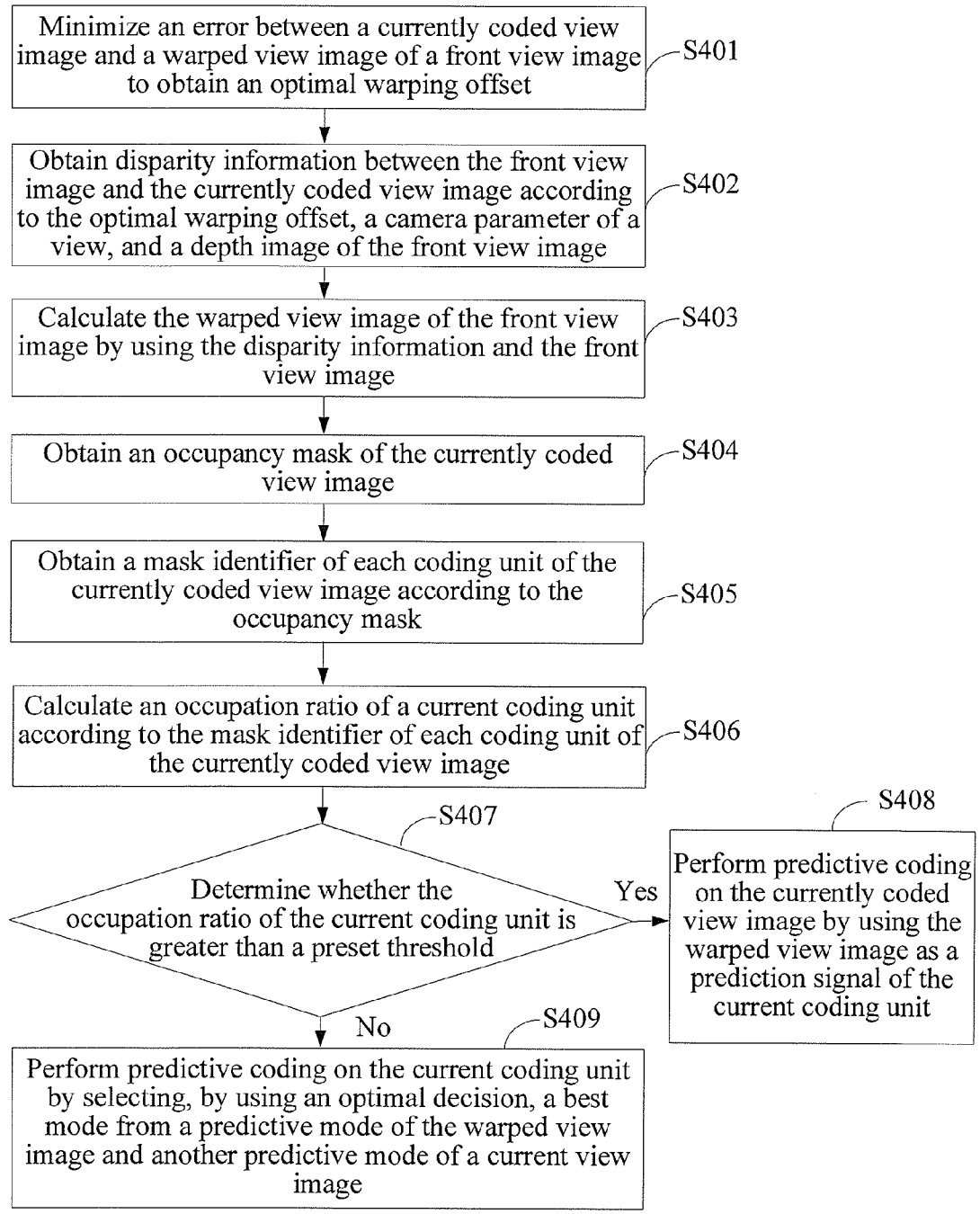
FIG. 4 is an implementation flowchart of a multi-view video coding method according to another embodiment of the present invention.

FIG. 4 shows an implementation process of a multi-view video coding method according to another embodiment of the present invention. Step S401 and step S402 are the same as step S101 and step S102 in FIG. 1, with a difference in that the following steps are further included:

In step S403, calculate the warped view image of the front view image by using the disparity information and the front view image.

In step S404, obtain an occupancy mask of the currently coded view image, where the occupancy mask is used for describing whether a pixel of the front view image can be warped into the currently coded view image.

A specific step of obtaining the occupancy mask is of the prior art, and is briefly described herein: when a warped view image is calculated, an occupancy mask (occupancy mask) is generated; the occupancy mask describes whether a pixel of a front view image can be warped into a current view image; a manifestation of the occupancy mask is a Boolean occupancy mask with a size equal to that of a video; when a pixel is obtained successfully by being warped from another view, the pixel is indicated as occupied (that is, true) in the occupancy mask, otherwise, the pixel is indicated as vacant (that is, false); and the occupancy mask can be obtained by using the foregoing manner.

In step S405, obtain a mask identifier of each coding unit of the currently coded view image according to the occupancy mask.

In step S406, calculate an occupation ratio p(CU) of a current coding unit according to the mask identifier of each coding unit of the currently coded view image. A formula for calculating the occupation ratio p(CU) of the current coding unit may be as follows:

$$p(CU) = \frac{\sum_{CU} P_i}{size(CU)}$$

where $P_i$ is a mask identifier of each pixel of the current coding unit, and has a value of 0 or 1; and size(CU) is the number of all pixels in the coding unit.

In step S407, determine whether the occupation ratio p(CU) of the current coding unit is greater than a preset threshold; if yes, perform step S408, otherwise, perform step S409.

In step S408, perform predictive coding on the currently coded view image by using the warped view image as a prediction signal of the current coding unit.

In step S409, perform predictive coding on the current coding unit by selecting, by using an optimal decision, a best mode from a predictive mode of the warped view image and another predictive mode of the current view image. The predictive mode of the warped view image refers to a mode in which predictive coding is performed on the currently coded view image by using the warped view image as a prediction signal of the current coding unit. The optimal decision includes, but is not limited to, a rate-distortion decision.

In the embodiment of the present invention, when predictive coding is performed on the current coding unit by selecting, by using the rate-distortion decision, the best mode from the predictive mode of the warped view image and the another predictive mode of the current view image, predictive coding is performed on the current coding unit by selecting, by using the rate-distortion decision, a mode with a lowest cost from the predictive mode of the warped view image and the another predictive mode of the current view image.

In the embodiment of the present invention, by performing, according to the occupation ratio p(CU) of a current coding unit, predictive coding on a currently coded view image by directly using a warped view image as a prediction signal of the current coding unit, or performing predictive coding on the current coding unit by selecting, by using an optimal decision, a best mode from a predictive mode of the warped view image and another predictive mode of a current view image, precision of the coding prediction can be enhanced, and better rate-distortion performance can be achieved.

In an exemplary embodiment of the present invention, when the occupation ratio of the current coding unit is less than or equal to a preset threshold, the method further includes:

identifying, by using a mode indicating symbol, the best mode selected, by using the optimal decision, from the predictive mode of the warped view image and the another predictive mode of the current view image, and writing the mode indicating symbol into a code stream. In this manner, a decoding end can perform parsing according to the mode indicating symbol to determine which mode is to be used to perform predictive decoding on the current coding unit. For example, the mode indicating symbol may be represented by WarpSkip-Mode.

Embodiment 5

Figure 5:
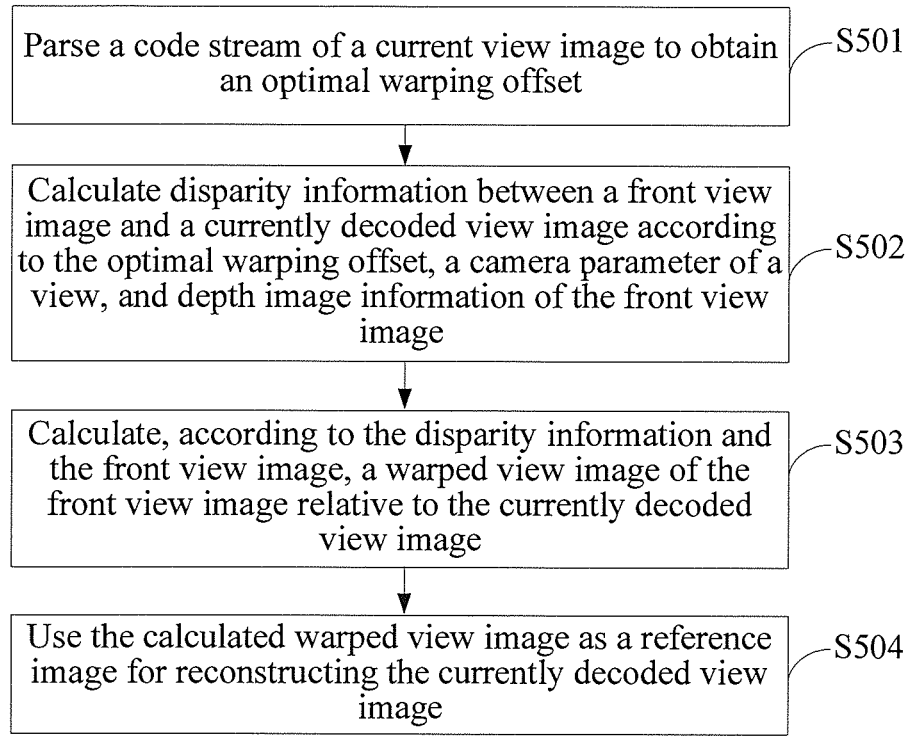
FIG. 5 is an implementation flowchart of a multi-view video decoding method according to an embodiment of the present invention.

FIG. 5 shows an implementation process of a multi-view video decoding method according to an embodiment of the present invention. Details are described as follows:

In step S501, parse a code stream of a current view image to obtain an optimal warping offset.

In the embodiment of the present invention, when a coding end codes a multi-view video, the coding end codes an optimal warping offset of each view into a code stream; therefore, by parsing the code stream of the current view image, the optimal warping offset of each view can be obtained.

In step S502, calculate disparity information between a front view image and a currently decoded view image according to the optimal warping offset, a camera parameter of a view, and depth image information of the front view image. The front view image may be a front decoded view image of the currently decoded view image in a spatial domain. A specific process of calculating the disparity information between the front view image and the currently decoded view image is as follows:

calculating an initial disparity signal according to the camera parameter of the view and the depth image information of the front view image;

obtaining an offset correction signal according to the optimal warping offset and the depth image information of the front view image; and obtaining the disparity information between the front view image and the currently decoded view image according to the initial disparity signal and the offset correction signal.

In the embodiment of the present invention, the disparity information between the front view image and the currently decoded view may be calculated by using the following formula:

$$disp(p) = \frac{f}{z} * (X_{add} - X_{base}) + offset_i * \frac{d}{d_{max}} * \alpha$$

In step S503, calculate, according to the disparity information and the front view image, a warped view image of the front view image relative to the currently decoded view image (the warped view image of the front view image relative to the currently decoded view image may also be called the warped view image of the front view image). A specific step of calculating the warped view image of the front view image relative to the currently decoded view image is as follows:

obtaining the warped view image of the front view image relative to the currently decoded view image by shifting, according to the disparity information, a pixel of the front view image.

In step S504, use the calculated warped view image as a reference image for reconstructing the currently decoded view image. A reconstructed image is constructed by using both other decoded information and the reference image, so that the decoding and reconstruction of a currently decoded view is implemented.

In the embodiment of the present invention, an optimal warping offset in a code stream is decoded, disparity information is obtained according to the optimal warping offset, a warped view image of a front view image is obtained according to the disparity information, the warped view image is used as a reference image for reconstructing a currently decoded view image, and a reconstructed image is constructed by using both other decoded information and the reference image, so that the decoding and reconstruction of a currently decoded view can be implemented.

In the embodiment of the present invention, the optimal warping offset may be an optimal warping offset of both a warped video image of the front view image and a warped depth image, or include respective optimal warping offsets of the warped video image of the front view image and the warped depth image. When the optimal warping offset includes the respective optimal warping offsets of the warped video image of the front view image and the warped depth image, the respective optimal warping offsets of the warped video image of the front view image and the warped depth image can be obtained when a decoding end performs decoding.

Embodiment 6

Figure 6:
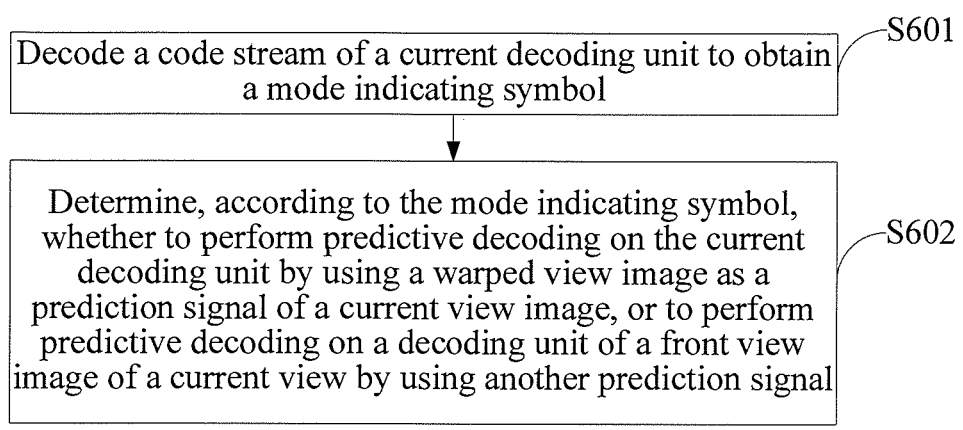
FIG. 6 is an implementation flowchart of a multi-view video decoding method according to another embodiment of the present invention.

FIG. 6 shows an implementation process of a multi-view video decoding method according to another embodiment of the present invention. Details are described as follows:

In step S601, decode a code stream of a current decoding unit to obtain a mode indicating symbol, for example, WarpSkip-Mode.

In the embodiment of the present invention, when a coding end codes a multi-view video, the coding ending codes a mode indicating symbol of each coding unit into a code stream; therefore, by decoding a code stream of a current view image, code of the mode indicating symbol of each decoding unit can be obtained by decoding.

In step S602, determine, according to the mode indicating symbol, whether to perform predictive decoding on the current decoding unit by using a warped view image as a prediction signal of the current view image, or to perform predictive decoding on a decoding unit of the current view image by using another prediction signal. An example is used for description in the following:

If the mode indicating symbol WarpSkip-Mode=1, predictive decoding is performed on a currently decoded view image by using the warped view image as a prediction signal of the decoding unit of the current view image. A decoding end does not need other information such as a decoding residual of the decoding unit. If the mode indicating symbol WarpSkip-Mode=0, the current decoding unit performs predictive decoding on a decoding unit of the currently decoded view image by using another predictive decoding mode.

Embodiment 7

Figure 7:
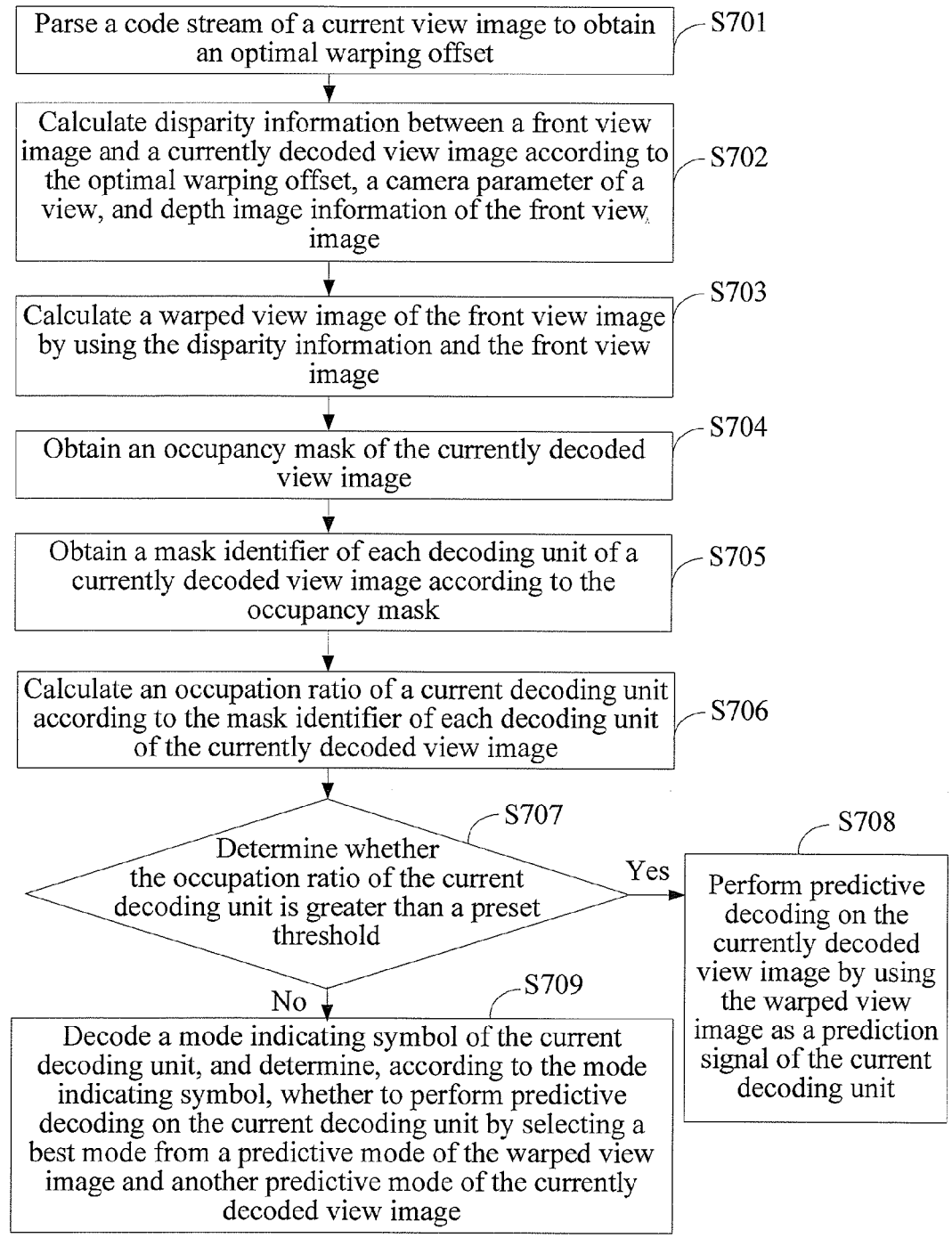
FIG. 7 is an implementation flowchart of a multi-view video decoding method according to another embodiment of the present invention.

FIG. 7 shows an implementation process of a multi-view video decoding method according to another embodiment of the present invention. Step S701 and step S702 are the same as step S501 and step S502 in FIG. 5, with a difference in that the following steps are further included:

In step S703, calculate a warped view image of the front view image by using the disparity information and the front view image.

In step S704, obtain an occupancy mask of the currently decoded view image, where the occupancy mask is used for describing whether a pixel of the front view image can be warped into the currently decoded view image.

In step S705, obtain a mask identifier of each decoding unit of the currently decoded view image according to the occupancy mask.

In step S706, calculate an occupation ratio p(CU) of a current decoding unit according to the mask identifier of each decoding unit of the currently decoded view image. A formula for calculating the occupation ratio p(CU) of the current decoding unit may be as follows:

$$p(CU) = \frac{\sum_{CU} P_i}{\text{size}(CU)}$$

where $P_i$ is a mask identifier of each pixel of a current decoding unit, and has a value of 0 or 1; and size(CU) is the number of all pixels in the decoding unit.

In step S707, determine whether the occupation ratio p(CU) of the current decoding unit is greater than a preset threshold; if yes, perform step S708, otherwise, perform step S709.

In step S708, perform predictive decoding on the currently decoded view image by using the warped view image as a prediction signal of the current decoding unit.

In step S709, decode a mode indicating symbol of the current decoding unit, and determine, according to the mode indicating symbol, whether to perform predictive decoding on the current decoding unit by selecting a best mode from a predictive mode of the warped view image and another predictive mode of the currently decoded view image.

An example is used for description in the following: If the mode indicating symbol is 1, predictive decoding is performed on the current decoding unit by using the predictive mode of the warped view image; and if the mode indicating symbol is 0, decoding is performed on the current decoding unit by using another predictive decoding mode.

The occupancy mask may be calculated as a whole in a decoding process, and the occupancy mask may also be calculated when each decoding unit is decoded.

In a decoding process, the warped view image may be calculated as a whole, or may also be calculated when each decoding unit is decoded.

Embodiment 8

Figure 8:
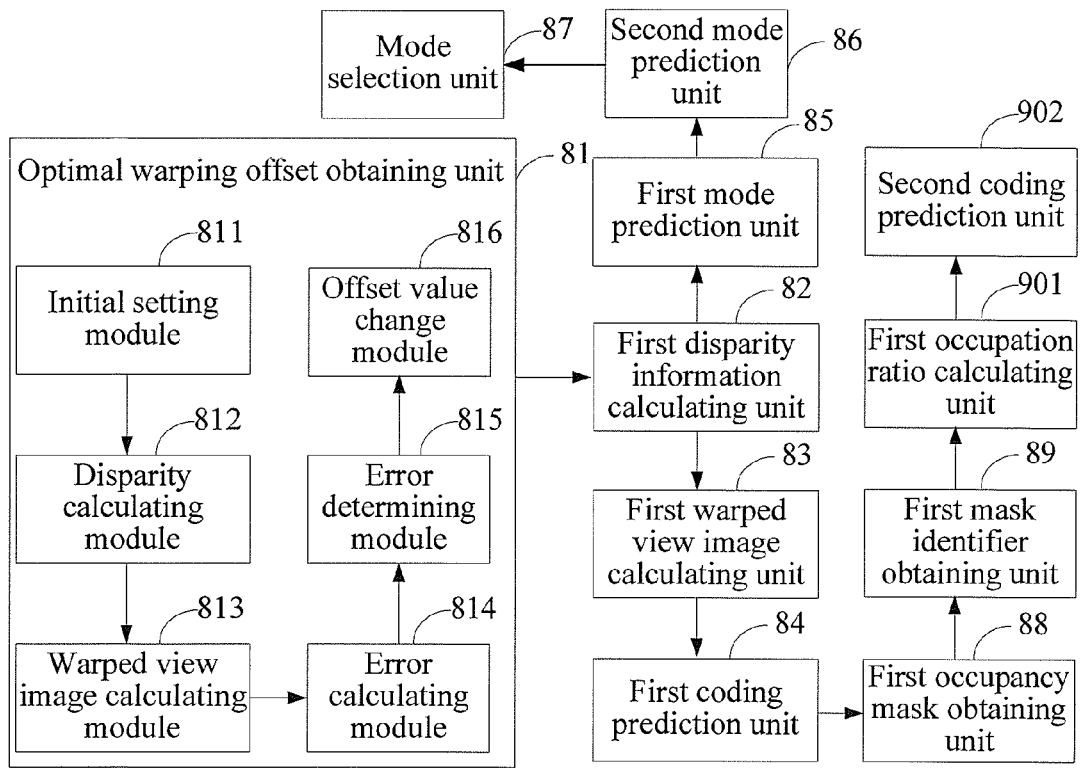
FIG. 8 is a structural block diagram of a multi-view video coding apparatus according to an embodiment of the present invention.

FIG. 8 shows a multi-view video coding apparatus according to an embodiment of the present invention; and for ease of description, only a part related to the embodiment of the present invention is shown. The multi-view video coding apparatus may be used in a coder, may be a software unit, a hardware unit, or a unit combining software and hardware, which operates in the coder, or may also be an independent widget integrated in the coder or an application system operating in the coder, where:

an optimal warping offset obtaining unit 81 minimizes an error between a currently coded view image and a warped view image of a front view image to obtain an optimal warping offset.

The view image includes a video image and a depth image. The warped view image includes a warped video image and a warped depth image. The error between the currently coded view image and the warped view image of the front view image includes, but is not limited to, a sum of absolute differences (Sum of Absolute Differences, SAD), a mean square error (Mean Square Error, MSE), a sum of squares for error (Sum of Squares for Error, SSE) and the like.

The optimal warping offset obtaining unit 81 minimizes the error between the currently coded view image and the warped view image of the front view image in multiple manners. For example, the following manner may be used: setting a preset offset range, correcting the disparity information between the front view image and the currently coded view image by separately using all values in the preset offset range as a warping offset, obtaining the warped view image of the front view image by using the disparity information, calculating the error between the currently coded view image and the warped view image of the front view image, selecting, from the preset offset range, a value making the error between the currently coded view image and the warped view image of the front view image minimum, and determining the value as an optimal warping offset. All the values in the preset offset range include an integral value or a fractional value, and the fractional value is a fractional value with one decimal place.

A first disparity information calculating unit 82 obtains disparity information between the front view image and the currently coded view image according to the optimal warping offset, a camera parameter of a view, and depth image information of the front view image.

In the embodiment of the present invention, disparity information of each pixel position between the front view image and the currently coded view image may be calculated by using the following formula:

$$disp(p) = \frac{f}{z} * (X_{add} - X_{base}) + offset_i * \frac{d}{d_{max}} * \alpha$$

A first warped view image calculating unit 83 calculates a warped view image of the front view image according to the disparity information and the front view image.

A first coding prediction unit 84 predicts the currently coded view image by using the warped view image calculated by the first warped view image calculating unit 83 as a prediction signal.

In an exemplary embodiment of the present invention, the optimal warping offset obtaining unit 81 includes:

an initial setting module 811, configured to set a warping offset value $offset_i$;

an disparity calculating module 812, configured to calculate the disparity information between the front view image and the currently coded view image according to the warping offset value $offset_i$, the camera parameter of the view, and the depth image information of the front view image;

a warped view image calculating module 813, configured to calculate the warped view image of the front view image according to the disparity information and the front view image;

an error calculating module 814, configured to calculate an error between the warped view image and an original image of the currently coded view image;

an error determining module 815, configured to determine whether the error between the warped view image and the original image of the currently coded view image is less than a current minimum error value, where the minimum error value is set to a maximal value in a beginning stage; and an offset value change module 816, configured to set $offset_{opt} = offset_i$ and $MSE(offset_{opt}) = MSE(offset_i)$ and change the warping offset value $offset_i$ within a preset offset range, which is preset, when the error determining module 815 determines that the error between the warped view image and the original image of the currently coded view image is less than the current minimum error value; otherwise, directly change the warping offset value $offset_i$ within the preset offset range that is preset. The offset value change module 816 then triggers the disparity calculating module 812 to recalculate the disparity information between the front view image and the currently coded view image by using the changed warping offset value $offset_i$, the camera parameter of the view, and the depth image information of the front view image. Cyclic interaction occurs between the foregoing modules until all values in the preset offset range are traversed.

In an exemplary embodiment of the present invention, the multi-view video coding apparatus further includes a first mode prediction unit 85, a second mode prediction unit 86, and a mode selection unit 87, where:

the first mode prediction unit 85 calculates the warped view image of the front view image according to the disparity information and the front view image, and performs predictive coding on the currently coded view image by using the warped view image as a prediction signal, so as to obtain a first prediction result;

the second mode prediction unit 86 performs predictive coding on the currently coded view image by using another predictive coding mode of the currently coded view image, so as to obtain a second prediction result; and the mode selection unit 87 performs predictive coding on a current coding unit by selecting, according to the first prediction result and the second prediction result and by using an optimal decision, a best mode from a predictive mode of the warped view image and another predictive mode of a current view image, and writes a mode indicating symbol into a code stream. The optimal decision includes, but is not limited to, a rate-distortion decision. The mode indicating symbol is used for identifying the best mode that is selected, by using the optimal decision, from the predictive mode of the warped view image and the other predictive mode of the current view image. The predictive mode of the warped view image refers to a mode in which predictive coding is performed on the currently coded view image by using the warped view image as a prediction signal.

In an exemplary embodiment of the present invention, the apparatus further includes a first occupancy mask obtaining unit 88, a first mask identifier obtaining unit 89, a first occupation ratio calculating unit 901, and a second coding prediction unit 902, where: the first occupancy mask obtaining unit 88 obtains an occupancy mask of the currently coded view image, where the occupancy mask is used for describing whether a pixel of the front view image can be warped into the currently coded view image;

the first mask identifier obtaining unit 89 obtains a mask identifier of each coding unit of the currently coded view image according to the occupancy mask;

the first occupation ratio calculating unit 901 calculates an occupation ratio p(CU) of a current coding unit according to the mask identifier of each coding unit of the currently coded view image, where a formula for calculating the occupation ratio p(CU) of the current coding unit is as follows:

$$p(CU) = \frac{\sum_{CU} P_i}{size(CU)};$$

and the second coding prediction unit 902 determines whether the occupation ratio of the current coding unit is greater than a preset threshold; if yes, performs predictive coding on the current view image by using the warped view image as a prediction signal of the current coding unit; and if not, performs predictive coding on the current coding unit by selecting, by using an optimal decision, a best mode from a predictive mode of the warped view image and a conventional coding prediction mode of the current view image.

Embodiment 9

Figure 9:
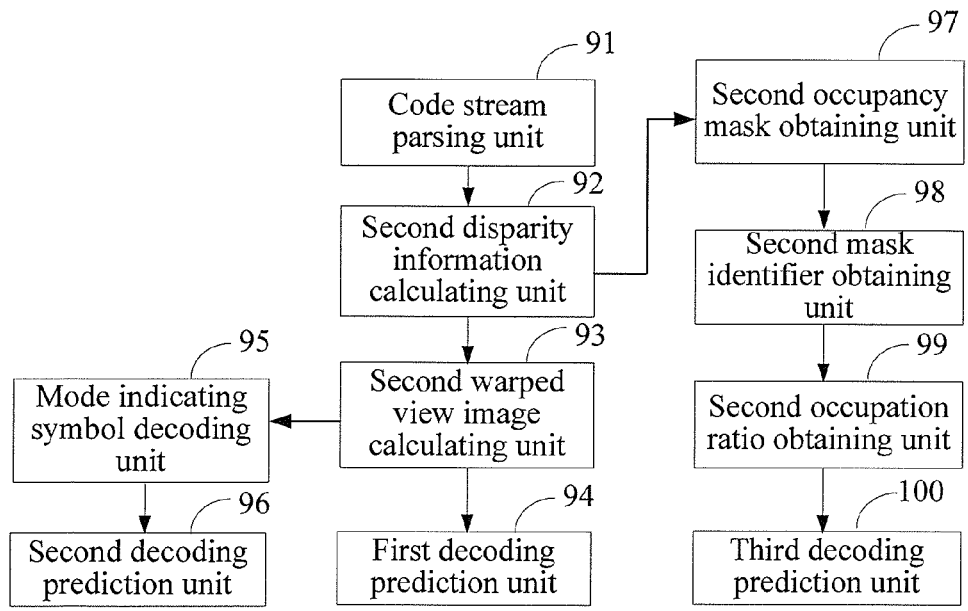
FIG. 9 is a structural block diagram of a multi-view video decoding apparatus according to an embodiment of the present invention.

FIG. 9 shows a multi-view video decoding apparatus according to an embodiment of the present invention; and for ease of description, a part related to the embodiment of the present invention are shown.

The multi-view video decoding apparatus may be used in a decoder, may be a software unit, a hardware unit, or a unit combining software and hardware, which operates in the decoder, or may also be an independent widget integrated in the decoder or an application system operating in the decoder, where:

a code stream parsing unit 91 parses a code stream of a current view image to obtain an optimal warping offset.

In the embodiment of the present invention, when a coding end performs coding, the coding end codes an optimal warping offset value offset$_i$ into a code stream; therefore, when the code stream of the current view image is decoded, the optimal warping offset can be decoded.

A second disparity information calculating unit 92 calculates disparity information between a front view image and a currently decoded view image according to the optimal warping offset, a camera parameter of a view, and depth image information of the front view image. The front view image may refer to be a front decoded view image of the currently decoded view image in a spatial domain. A specific process of calculating the disparity information between the front view image and the currently decoded view image is as follows:

$$disp(p) = \frac{f}{z} * (X_{add} - X_{base}) + offset_i * \frac{d}{d_{max}} * \alpha$$

A second warped view image calculating unit 93 calculates a warped view image of the front view image according to the obtained disparity information and the front view image. A specific process of calculating the warped view image of the front view image is as follows: obtaining the warped view image of the front view image by shifting, according to the disparity information, a pixel of the front view image.

A first decoding prediction unit 94 uses the calculated warped view image as a reference image for reconstructing the currently decoded view image. A decoding end constructs a reconstructed image by using both other decoded information and the reference image, thereby implementing the decoding and reconstruction of a currently decoded view.

In an exemplary embodiment of the present invention, the multi-view video decoding apparatus further includes a mode indicating symbol decoding unit 95 and a second decoding prediction unit 96.

The mode indicating symbol decoding unit 95 obtains a mode indicating symbol when a current decoding unit is decoded.

The second decoding prediction unit 96 determines, according to the mode indicating symbol, whether to perform predictive decoding on the current decoding unit by using the warped view image as a prediction signal of the current view image, or perform predictive decoding on a decoding unit of the current view image by using another prediction signal.

In an exemplary embodiment of the present invention, the multi-view video decoding apparatus further includes a second occupancy mask obtaining unit 97, a second mask identifier obtaining unit 98, a second occupation ratio calculating unit 99, and a third decoding prediction unit 100, where:

the second occupancy mask obtaining unit 97 obtains an occupancy mask of the currently decoded view image, where the occupancy mask is used for describing whether a pixel of the front view image can be warped into the currently decoded view image;

the second mask identifier obtaining unit 98 obtains a mask identifier of each decoding unit of the currently decoded view image according to the occupancy mask;

the second occupation ratio calculating unit 99 calculates an occupation ratio of a current decoding unit according to the mask identifier of each decoding unit of the currently decoded view image; and the third decoding prediction unit 100 determines whether the occupation ratio of the current decoding unit is greater than a preset threshold; if yes, performs predictive decoding on the current view image by using the warped view image as a prediction signal of the current decoding unit; otherwise, decodes a mode indicating symbol of the current decoding unit, and determines, according to the mode indicating symbol, whether to decode the current decoding unit by using a predictive mode of the warped view image or to perform predictive decoding on the current decoding unit by using another predictive mode of the currently decoded view image.

In the whole specification of the present invention, an image represents a decoding unit, which may be a frame (frame), or may also be another unit such as a slice (slice). In a decoding process, the warped view image may be calculated as a whole, or may also be a current decoding unit reference corresponding to the warped view image and calculated when each decoding unit is decoded.

It should be noted the foregoing view reconstruction apparatus of the multi-view video and units included in the view reconstruction apparatus of the multi-view video are classified based on functional logic but are not limited to the foregoing classifications, as long as corresponding functions can be implemented. In addition, specific names of the functional units are merely provided for the purpose of distinguishing the units from one another, but are not intended to limit the protection scope of the present invention.

The video decoding end in the embodiments of the present invention may a processor (for example, a central processing unit CPU), an application specific integrated circuit (ASIC) or the like. The video decoding end in the embodiments of the present invention may be specifically a computer, a mobile phone, a set-top box, a television, another kind of electronic device, or the like.

A person of ordinary skill in the art should understand that, all of or a part of steps in the method according to the embodiments may be implemented by a program instructing relevant hardware. The program may be stored in a computer readable storage medium. The storage medium may be a ROM/RAM, a magnetic disk, or an optical disc.

In the embodiments of the present invention, an optimal warping offset is obtained by minimizing an error between a currently coded view image and a warped view image of a front view image, and disparity information is corrected by using the optimal warping offset, so as to enhance the precision of the warped view image, thereby decreasing a bit rate for coding another view residual, and improving the coding quality and coding compression performance of a 3DV coding method. The optimal warping offset is coded into a code stream, so that a decoding end can calculate the disparity information according to the optimal warping offset in the code stream and obtain a warped view image of a front view image according to the disparity information; and the warped view image of the front view image can be used as a reference image for reconstructing a current view image, so that the decoding end can decode and reconstruct each view. The current view image is predicted according to an occupation ratio p(CU) of a current coding unit and by directly using the warped view image as a prediction signal of the current coding unit, or the current view image is predicted by using both the warped view image and a conventional reference image of the current view image as prediction signals, so that the precision of coding prediction can be improved and better rate-distortion performance can be obtained. At the decoding end, the optimal warping offset in the code stream is decoded, the disparity information is obtained according to the optimal warping offset, the warped view image of the front view image is obtained according to the disparity information, and the warped view image is used as a reference image for reconstructing a currently decoded view image, so that the decoding and reconstruction of a currently decoded view can be implemented.

The foregoing descriptions are merely exemplary embodiments of the present invention, but not intended to limit the present invention. Any modification, equivalent replacement, and improvement made without departing from the spirit and principle of the present invention shall fall within the protection scope of the present invention.

What is claimed is:

1. A multi-view video coding method, comprising:
    minimizing an error between a currently coded view image and a warped view image of a front view image to obtain an optimal warping offset;
    obtaining disparity information between the front view image and the currently coded view image according to the optimal warping offset, a camera parameter of a view, and depth image information of the front view image; and
    determining the warped view image of the front view image according to the disparity information and the front view image, and performing predictive coding on the currently coded view image by using the warped view image as a prediction signal.

2. The multi-view video coding method according to claim 1, wherein the error between the currently coded view image and the warped view image of the front view image comprises:
    a sum of absolute differences SAD, or a mean square error MSE, or a sum of squares for error SSE.

3. The multi-view video coding method according to claim 1, wherein the optimal warping offset is an optimal warping offset of both a warped video image of the front view image and a warped depth image, or the optimal warping offset comprises respective optimal warping offsets of the warped video image of the front view image and a warped depth image.

4. The multi-view video coding method according to claim 1, wherein minimizing an error between a currently coded view image and a warped view image of a front view image to obtain an optimal warping offset comprises:
    setting a preset offset range, correcting the disparity information between the front view image and the currently coded view image by separately using all values in the preset offset range as a warping offset, obtaining the warped view image of the front view image by using the disparity information, calculating the error between the currently coded view image and the warped view image of the front view image, selecting, from the preset offset range, a value making the error between the currently coded view image and the warped view image of the front view image minimum, and determining the value as the optimal warping offset, wherein all the values in the preset offset range comprise an integral value or a fractional value, and the fractional value is a fractional value with one decimal place.

5. The multi-view video coding method according to claim 1, wherein minimizing an error between a currently coded view image and a warped view image of a front view image to obtain an optimal warping offset comprises:
    a. setting a warping offset value $offset_i$;
    b. determining the disparity information between the front view image and the currently coded view image according to the warping offset value $offset_i$, the camera parameter of the view, and the depth image information of the front view image;
    c. determining the warped view image of the front view image according to the disparity information and the front view image;
    d. calculating an error between the warped view image and an original image of the currently coded view image;
    e. determining whether the error between the warped view image and the original image of the currently coded view image is less than a current minimum error value; if yes, performing step f; otherwise, performing step g;
    f. setting $offset_{opt}$=$offset_i$ and MSE($offset_{opt}$)=MSE($offset_i$) and
    g. changing the warping offset value $offset_i$ within a preset offset range that is preset, returning to step b, and a cycle ends when all values in the preset offset range are traversed.

6. The method according to claim 1, wherein obtaining disparity information between the front view image and the currently coded view image according to the optimal warping offset, a camera parameter of a view, and depth image information of the front view image comprises:
    calculating an initial disparity signal according to the camera parameter of the view and the depth image information of the front view image;

obtaining an offset correction signal according to the optimal warping offset and the depth image information of the front view image; and obtaining the disparity information between the front view image and the currently coded view image according to the initial disparity signal and the offset correction signal.

7. The method according to claim 1, wherein the disparity information between the front view image and the currently coded view image is obtained by using the following formula:

$$disp(p) = \frac{f}{z} * (X_{add} - X_{base}) + offset_i * \frac{d}{d_{max}} * \alpha$$

wherein f is a focal length of a camera of a current view image, z is a distance between an object and the view, $X_{add}$ is a position of the current view image at a view line in 3D space, $X_{base}$ is a position of the front view image at the view line in the 3D space, d is a depth value of a current pixel, $d_{max}$ is a maximum depth value of a depth of the current view image, and α is a pixel precision.

8. The multi-view video coding method according to claim 1, wherein after minimizing an error between a currently coded view image and a warped view image of a front view image to obtain an optimal warping offset, the method further comprises:

writing the optimal warping offset into a code stream.

9. The multi-view video coding method according to claim 1, wherein after obtaining disparity information between the front view image and the currently coded view image according to the optimal warping offset, a camera parameter of a view, and depth image information of the front view image, comprises:

calculating the warped view image of the front view image according to the disparity information and the front view image, and performing predictive coding on the currently coded view image by using the warped view image as a prediction signal, so as to obtain a first prediction result;

performing predictive coding on the currently coded view image by using another predictive coding mode of the currently coded view image, so as to obtain a second prediction result; and performing predictive coding on a current coding unit by selecting, according to the first prediction result and the second prediction result and by using an optimal decision, a best mode from a predictive mode of the warped view image and another predictive mode of the current view image, and writing a mode indicating symbol into a code stream, wherein the mode indicating symbol is used for selecting the best mode from the predictive mode of the warped view image and the another predictive mode of the current view image by using the optimal decision.

10. The multi-view video coding method according to claim 1, wherein calculating the warped view image of the front view image by using the disparity information and the front view image, and predicting the currently coded view image by using the warped view image as a prediction signal comprises:

calculating the warped view image of the front view image by using the disparity information and the front view image;

obtaining an occupancy mask of the currently coded view image, wherein the occupancy mask is used for describing whether a pixel of the front view image can be warped into the currently coded view image;

obtaining a mask identifier of each coding unit of the currently coded view image according to the occupancy mask;

calculating an occupation ratio of a current coding unit according to the mask identifier of each coding unit of the currently coded view image; and determining whether the occupation ratio of the current coding unit is greater than a preset threshold; if yes, performing predictive coding on the currently coded view image by using the warped view image as a prediction signal of the current coding unit; and if not, performing predictive coding on the current coding unit by selecting, by using an optimal decision, a best mode from a predictive mode of the warped view image and another predictive mode of a current view image.

11. The multi-view video coding method according to claim 10, wherein when the occupation ratio of the current coding unit is less than or equal to the preset threshold, the method further comprises:

identifying, by using a mode indicating symbol, the best mode selected, by using the optimal decision, from the predictive mode of the warped view image and the another predictive mode of the current view image, and writing the mode indicating symbol into a code stream.

12. The multi-view video coding method according to claim 9, wherein the optimal decision is a rate-distortion decision.

13. The multi-view video coding method according to claim 10, wherein the occupation ratio p(CU) of the current coding unit is calculated by using the following formula:

$$p(CU) = \frac{\sum_{CU} P_i}{\text{size}(CU)}$$

wherein $P_i$ is a mask identifier of each pixel of the current coding unit, and size(CU) is the number of all pixels in the coding unit.

14. A multi-view video decoding method, comprising:

parsing a code stream of a current view image to obtain an optimal warping offset;

determining disparity information between a front view image and a currently decoded view image according to the optimal warping offset, a camera parameter of a view, and depth image information of the front view image;

calculating a warped view image of the front view image according to the disparity information and the front view image; and using the warped view image as a reference image for reconstructing the currently decoded view image.

15. The multi-view video decoding method according to claim 14, wherein the optimal warping offset is an optimal warping offset of both a warped video image of the front view image and a warped depth image, or the optimal warping offset comprises respective optimal warping offsets of the warped video image of the front view image and the warped depth image.

16. The multi-view video decoding method according to claim 14, wherein obtaining disparity information between the front view image and the currently coded view image according to the optimal warping offset, a camera parameter of a view, and depth image information of the front view image comprises:
  calculating an initial disparity signal according to the camera parameter of the view and the depth image information of the front view image;
  obtaining an offset correction signal according to the optimal warping offset and the depth image information of the front view image; and
  obtaining the disparity information between the front view image and the currently coded view image according to the initial disparity signal and the offset correction signal.

17. The multi-view video decoding method according to claim 14, wherein when the disparity information between the front view image and the currently decoded view image is determined according to the optimal warping offset, the camera parameter of the view, and the depth image information of the front view image, the disparity information between the front view image and the currently decoded view image is calculated by using the following formula:

$$disp(p) = \frac{f}{z} * (X_{add} - X_{base}) + offset_i * \frac{d}{d_{max}} * \alpha$$

wherein f is a focal length of a camera of a current view image, z is a distance between an object and the view, $X_{add}$ is a position of the current view image at a view line in 3D space, $X_{base}$ is a position of the front view image at the view line in the 3D space, d is a depth value of a current pixel, $d_{max}$ is a maximum depth value of a depth of the current view image, and α is a pixel precision.

18. The multi-view video decoding method according to claim 14, wherein calculating the warped view image of the front view image by using the disparity information and the front view image, and predicting the currently decoded view image by using the warped view image as a prediction signal comprises:
  when a code stream of a current decoding unit is decoded, obtaining a mode indicating symbol by decoding, and determining, according to the mode indicating symbol, whether to perform predictive decoding on the current decoding unit by using the warped view image as a prediction signal of the current view image, or to perform predictive decoding on a decoding unit of the current view image by using another prediction signal.

19. The multi-view video decoding method according to claim 14, wherein calculating the warped view image of the front view image by using the disparity information and the front view image, and predicting the currently decoded view image by using the warped view image as a prediction signal comprises:
  calculating the warped view image of the front view image by using the disparity information and the front view image;
  obtaining an occupancy mask of the currently decoded view image, wherein the occupancy mask is used for describing whether a pixel of the front view image can be warped into the currently decoded view image;
  obtaining a mask identifier of each decoding unit of the currently decoded view image according to the occupancy mask;
  calculating an occupation ratio of a current decoding unit according to the mask identifier of each decoding unit of the currently decoded view image; and
  determining whether the occupation ratio of the current decoding unit is greater than a preset threshold; if yes, performing predictive decoding on the currently decoded view image by using the warped view image as a prediction signal of the current decoding unit; otherwise, decoding a mode indicating symbol of the current decoding unit, and determining, according to the mode indicating symbol, whether to perform predictive decoding on a current decoding unit by using a best mode selected from a predictive mode of the warped view image and another predictive mode of the currently decoded view image.

20. A multi-view video coding apparatus, comprising:
  an optimal warping offset obtaining unit, configured to minimize an error between a currently coded view image and a warped view image of a front view image to obtain an optimal warping offset;
  a first disparity information calculating unit, configured to obtain disparity information between the front view image and the currently coded view image according to the optimal warping offset, a camera parameter of a view, and depth image information of the front view image;
  a first warped view image calculating unit, configured to determine the warped view image of the front view image according to the disparity information and the front view image; and
  a first coding prediction unit, configured to perform predictive coding on the currently coded view image by using the warped view image as a prediction signal.

21. The multi-view video coding apparatus according to claim 20, wherein the optimal warping offset obtaining unit comprises:
  an initial setting module, configured to set a warping offset value $offset_i$;
  a disparity calculating module, configured to determine the disparity information between the front view image and the currently coded view image according to the warping offset value $offset_i$, the camera parameter of the view, and the depth image information of the front view image;
  a warped view image calculating module, configured to determine the warped view image of the front view image according to the disparity information and the front view image;
  an error calculating module, configured to calculate an error between the warped view image and an original image of the currently coded view image;
  an error determining module, configured to determine whether the error between the warped view image and the original image of the currently coded view image is less than a current minimum error value; and
  an offset value change module, configured to set $offset_{opt}=offset_i$ and $MSE(offset_{opt})=MSE(offset_i)$ and change the warping offset value $offset_i$ within a preset offset range, which is preset, when the error determining module determines that the error between the warped view image and the original image of the currently coded view image is less than the current minimum error value; otherwise, change the warping offset value $offset_i$ within the preset offset range that is preset.

22. The multi-view video coding apparatus according to claim 20, wherein the apparatus further comprises:

a first mode prediction unit, configured to calculate the warped view image of the front view image according to the disparity information and the front view image, and perform predictive coding on the currently coded view image by using the warped view image as a prediction signal, so as to obtain a first prediction result;

a second mode prediction unit, configured to perform predictive coding on the currently coded view image by using another predictive coding mode of the currently coded view image, so as to obtain a second prediction result; and a mode selection unit, configured to perform predictive coding on a current coding unit by selecting, according to the first prediction result and the second prediction result and by using an optimal decision, a best mode from a predictive mode of the warped view image and another predictive mode of the currently coded view image, and write a mode indicating symbol into a code stream, wherein the mode indicating symbol is used for identifying the best mode that is selected, by using the optimal decision, from the predictive mode of the warped view image and the another predictive mode of the currently coded view image.

23. The multi-view video coding apparatus according to claim 20, wherein the apparatus further comprises:
a first occupancy mask obtaining unit, configured to obtain an occupancy mask of the currently coded view image, wherein the occupancy mask is used for describing whether a pixel of the front view image can be warped into the currently coded view image;
a first mask identifier obtaining unit, configured to obtain a mask identifier of each coding unit of the currently coded view image according to the occupancy mask;
a first occupation ratio calculating unit, configured to calculate an occupation ratio of a current coding unit according to the mask identifier of each coding unit of the currently coded view image; and
a second coding prediction unit, configured to determine whether the occupation ratio of the current coding unit is greater than a preset threshold; if yes, perform predictive coding on the currently coded view image by using the warped view image as a prediction signal of the current coding unit; and if not, perform predictive coding on the current coding unit by selecting, by using an optimal decision, a best mode from a predictive mode of the warped view image and another coding prediction mode of the currently coded view image.

24. A multi-view video decoding apparatus, comprising:
a code stream parsing unit, configured to parse a code stream of a current view image to obtain an optimal warping offset;
a second disparity information calculating unit, configured to determine disparity information between a front view image and a currently decoded view image according to the optimal warping offset, a camera parameter of a view, and depth image information of the front view image;
a second warped view image calculating unit, configured to calculate a warped view image of the front view image according to the disparity information and the front view image; and
a first decoding prediction unit, configured to use the warped view image as a reference image for reconstructing the currently decoded view image.

25. The multi-view video decoding apparatus according to claim 24, further comprising:
a mode indicating symbol decoding unit, configured to obtain a mode indicating symbol by decoding when a current decoding unit is decoded; and
a second decoding prediction unit, configured to determine, according to the mode indicating symbol, whether to perform predictive decoding on the current decoding unit by using the warped view image as a prediction signal of the current view image, or to perform predictive decoding on a decoding unit of the current view image by using another prediction signal.

26. The multi-view video decoding apparatus according to claim 24, further comprising:
a second occupancy mask obtaining unit, configured to obtain an occupancy mask of the currently decoded view image, wherein the occupancy mask is used for describing whether a pixel of the front view image can be warped into the currently decoded view image;
a second mask identifier obtaining unit, configured to obtain a mask identifier of each decoding unit of the currently decoded view image according to the occupancy mask;
a second occupation ratio calculating unit, configured to calculate an occupation ratio of a current decoding unit according to the mask identifier of each decoding unit of the currently decoded view image; and
a third decoding prediction unit, configured to determine whether the occupation ratio of the current decoding unit is greater than a preset threshold; if yes, perform predictive decoding on the current view image by using the warped view image as a prediction signal of the current decoding unit; otherwise, decode a mode indicating symbol of the current decoding unit, and determine, according to the mode indicating symbol, whether to decode the current decoding unit by using a predictive mode of the warped view image or to perform predictive decoding on the current decoding unit by using another predictive mode of the currently decoded view image.

* * * * *